Jan. 20, 1959     W. SEIGLE     2,869,274
FISHING FLOAT

Filed May 22, 1957     2 Sheets-Sheet 1

INVENTOR.
William Seigle,
BY
Loyal J. Miller,
ATTORNEY

Jan. 20, 1959 W. SEIGLE 2,869,274
FISHING FLOAT
Filed May 22, 1957 2 Sheets-Sheet 2

INVENTOR.
William Seigle,
BY
Loyal J. Miller
ATTORNEY

United States Patent Office 2,869,274
Patented Jan. 20, 1959

2,869,274
FISHING FLOAT
William Seigle, Dallas, Tex.

Application May 22, 1957, Serial No. 660,977

3 Claims. (Cl. 43—17)

The present invention relates to fishing floats or lures and more particularly to an illuminating fishing float for night fishing.

The float of the instant invention is an improvement over the float covered by a United States patent numbered 2,544,968, which was issued to me on March 13, 1951. The float of the patent and the instant invention both utilize a light bulb and a dry cell battery as a means of illumination.

In actual practice the device of the said patent tends to allow the bulb to become loose within the socket due partly to use of the device and in view of the type of threaded connection between the two.

It is therefore one of the principal objects of the instant invention to provide a means for removably securing the light bulb within its socket against accidental loosening of the same while in use.

A similarly important object is to provide a bulb socket means which may be readily adjusted for different sizes of threaded bulbs.

An additional important object is to provide a means whereby the mass of the component parts of the device may be readily adjusted longitudinally of the exterior case thereof for altering the center of gravity, thereby altering the floating characteristics of the device relative to the surface of the water.

Another object is to provide a fishing float which will automatically be illuminated by a fish bite or strike on the line to which the device is secured.

A further object is to provide a fishing float or lure which is adaptable to be used on casting lines.

Still another object is to provide a float of this character in which the expendable parts thereof may be readily replaced.

Yet another object is to provide a fishing float of this class which may be adjusted to be illuminated when a fish bites the bait or which may be adjusted so that the light burns continuously, or not at all, as may be desired.

An additional object is to provide a fishing float which is light in weight and which is adaptable to be used on most any type of fishing line.

The present invention accomplishes these and other objects by providing a hollow elongated cylindrical body having removable end closure means thus forming a float. At least one of the end members is formed of transparent material. A resilient split sleeve is secured within a recess formed in the bore of the body for frictionally holding, in longitudinally adjustable relation, an elongated bracket. The bracket includes a pair of arcuate friction arms which carry a dry cell battery. A split socket pivotally mounted on the bracket adjacent the terminal end of the battery carries a light bulb which is moved into and out of electrical contact with the battery terminal by gravitational attraction as the position of the float changes. A spring wire clip carried by the bracket resiliently bears against the socket pivot pin and acts as a stabilizing means to prevent loss of electrical contact due to slight movement of the float. Exteriorly the two end closure means are provided with connecting loops or eyes for securing the float to a fishing line or the like.

Other objects will be apparent from the following description when taken in conjunction with the accompanying two sheets of drawings, wherein.

Like characters of reference designate like parts in those figures of the drawings in which they occur.

In the drawings.

Figure 1:
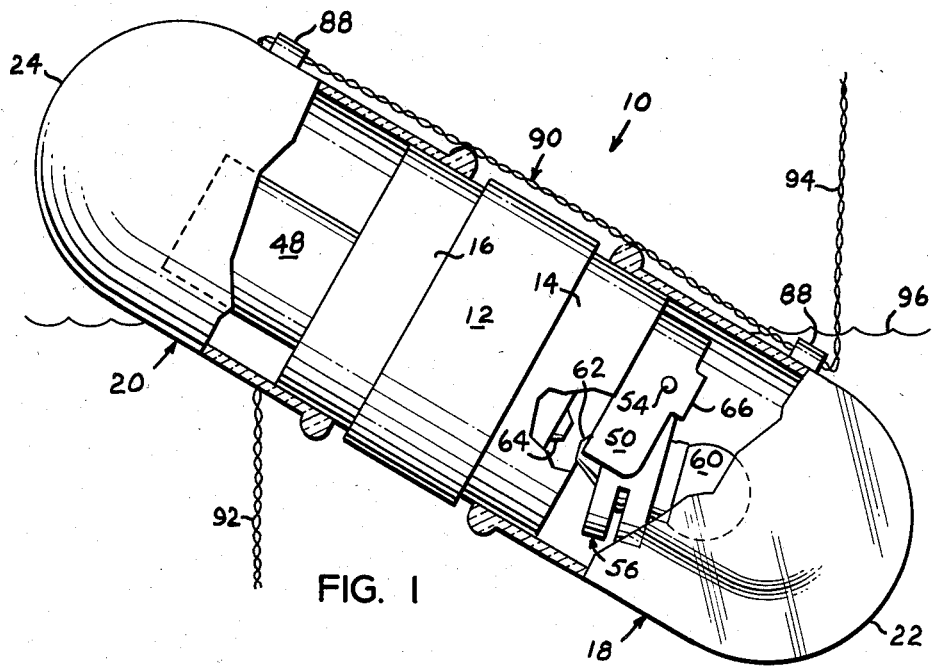
Figure 1 is an elevational side view of the device, partly in section, illustrating the position the device normally assumes when used as an illuminating night fishing float.

The reference numeral 10 indicates, as a whole, the device which is elongated and cylindrical-like in general configuration comprising a central tubate body 12 having circumferentially reduced end portions 14 and 16 adapted to receive tubular caps or closure means 18 and 20, respectively. The caps 18 and 20 have semi-spherical closed ends 22 and 24, respectively, thus forming a water tight float 10. At least one of the caps, preferably the cap 18, is formed of transparent material for the purposes which will presently be apparent.

Figure 6:
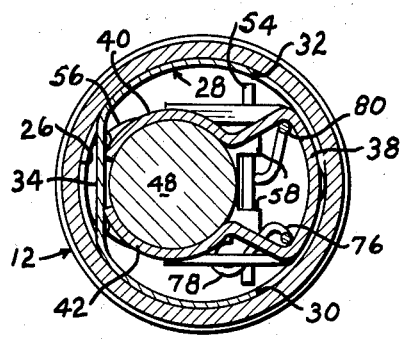
Figure 6 is a horizontal sectional view taken substantially along line 6—6 of Fig. 3.
Figure 5:
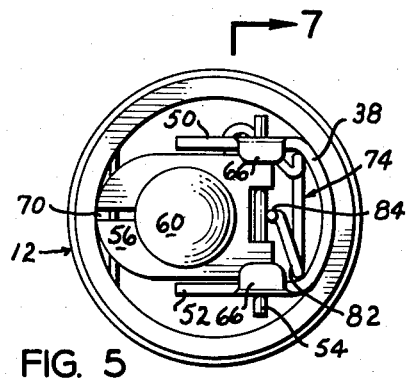
Figure 5 is an end view of the device with the adjacent end closure cap removed.

The body 12 is preferably formed of some suitable light weight material and diametrically is of a size which will readily receive the component parts more fully described hereinbelow, and when assembled with the caps 18 and 20 will displace a quantity of water exceeding the mass of the device. Intermediate its ends the bore of the body 12 is circumferentially enlarged to form an annular groove or recess 26. A split sleeve 28, formed of resilient metallic material, having a wall thickness substantially equal with relation to the depth of the recess 26 and having a length substantially equal to the longitudinal length of the recess, is co-operatingly received within the recess 26. A portion of the wall of the split sleeve 28 opposite the split as defined by the ends 30 and 32, forms a chord 34 which longitudinally subtends an arc of the recess 26 (Fig. 6).

Figure 3:
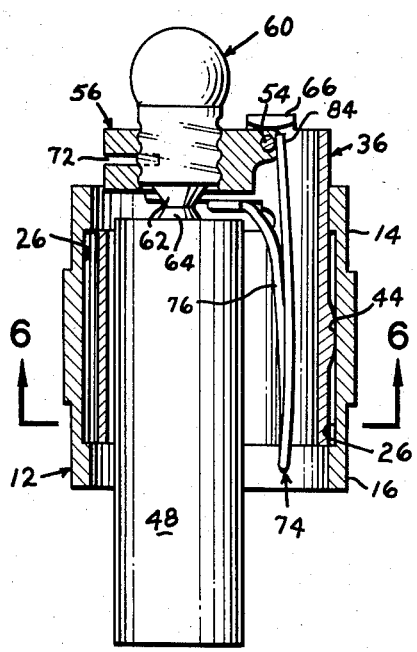
Figure 3 is a vertical sectional view of the device, partly in elevation and having the end closure means removed, the section being taken along the longitudinal axis of the device.
Figure 4:
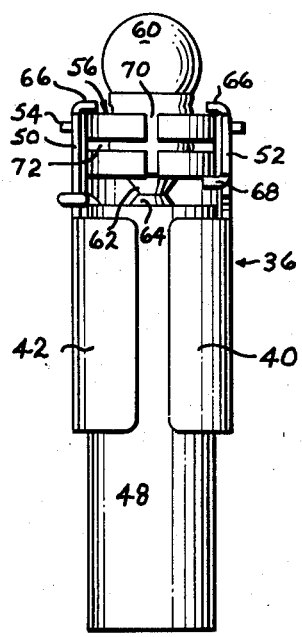
Figure 4 is an elevational view of the bracket and the electrical means associated therewith.
Figure 7:
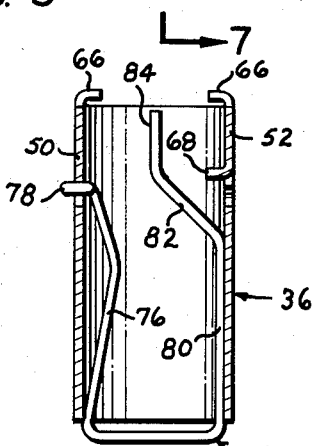
Figure 7 is a vertical sectional view taken substantially along line 7—7 of Fig. 5 and illustrating the position of the wire clip within the bracket.

An elongated bracket or battery holder 36 has one longitudinal side 38 thereof arcuately formed on a radius complemental with the radius of the bore of the body 12 and has a pair of co-operatingly disposed friction arms 40 and 42 which extend laterally of the side 38. The transverse distance across the bracket from the arcuate side 38 to the free ends of the arms 40 and 42 is slightly less than the diameter of the bore of the body 12 so that the bracket may be frictionally slid longitudinally into the body 12 and into the sleeve 28 therein. The ends of the arms 40 and 42 are preferably disposed against the chord 34 while the arcuate side 38 is received by the bore of the body 12 between the ends 30 and 32 of the split sleeve. Thus the resilience of the sleeve 28 maintains the bracket 36 at a selected position within the body 12. The arcuate side 38 is further provided with an integral lug or projection 44 intermediate its ends which extends outwardly a distance substantially equal to the depth of the recess 26 and thus maintains contact between the bore of the recess and the arcuate side 38. The arms 40 and 42 are arcuately curved for complementally receiving and holding a small dry cell battery 48 therebetween. The overall length of the bracket 36 is substantially equal to the length of the body 12 and longitudinally the arms 40 and 42 are substantially equal to the length of the split sleeve 28. The upper end portion of the bracket or holder 36, as seen in Figs. 3, 4, and 7, is provided with a pair of parallel side members 50 and 52 which extend laterally of the arcuate side 38 in spaced relation above the arms 40 and 42. A pivot pin 54 bridges the space between the side members 50 and 52 adjacent the upper end of the bracket, as viewed in Figs. 3 and 4.

A bulb carrier or socket 56 is pivotally mounted on the pin 54 by means of a pair of spaced-apart alignedly perforated bosses 58 through which and to which the pin 54 is extended and secured. The socket 56 is preferably formed of some relatively soft metallic material, such as lead, and is centrally bored axially and roll-threaded for receiving a conventional relatively small light bulb 60, such as a flashlight bulb. The base end 62 of the bulb is disposed inwardly of the bracket 36 toward the co-operating inwardly disposed terminal end 64 of the battery 48. Thus it may be seen that the socket 56 is free to gravitationally swing or pivot toward and away from the terminal end 64 of the battery for making or breaking an electrical circuit between the battery and the bulb, which is completed through the socket 56 and bracket 36. Movement of the socket 56 away from the battery 48 is limited by a pair of lugs 66 which co-operatingly project inwardly from the outwardly disposed end surfaces of the members 50 and 52 adjacent the bosses 58 and above the upper surface of the socket 56, as viewed in Figs. 3 and 4. Similarly movement of the socket toward the battery is limited by an inwardly projecting lug or prong 68 (Figs. 4 and 7) which contacts the inwardly disposed surface of the socket 56. Thus the socket 56 is free to pivot through only a relatively short distance as the position of the body 12 changes and this is preferably so in order that sudden changes of the position of the device will not result in the socket moving through an angle of travel which would result in sharp blows or a hammering action of the bulb base end 62 against the battery terminal 64 which would materially damage the bulb.

The free end portion of the socket 56 is provided with a vertical and a horizontal slot 70 and 72, respectively, as seen in Fig. 4, which extend inwardly and communicate with the threaded bore of the socket. The purpose of the horizontal slot 72 is to permit a slight compression of this free end portion of the socket for effecting a shortening of the thread pitch of the socket and impinging the bulb 60 therein thus preventing accidental loosening of the same while in use. Similarly the vertical slot 70 permits some adjustment of the diametrical size of the threaded bore of the socket to compensate for variations in bulb thread sizes.

When the device is disposed in the position shown by Figs. 3 and 4 the mass of the socket 56 insures good electrical contact between the bulb and battery terminal end 64 but when the device is disposed substantially horizontally, or at an angle approaching a horizontal position, the pin 54 supports most of the weight of the socket which results in poor contact between the bulb and the battery terminal. This action results in a flashing "on and off" of the light emitted by the bulb. To overcome this flashing of the light bulb 60 a stabilizing means in the form of a spring wire clip 74 is provided.

The clip 74 is carried by the bracket 36 inwardly of the arcuate side 38. The clip 74 is substantially U-shaped in general configuration and is adapted to be frictionally forced into the end of the bracket 36 opposite the socket end with one leg portion 76 contacting the lower end portion of the bracket, as viewed in Fig. 7, and extended upwardly therealong terminating in an arcuate end 78 horizontally disposed between the upper edge surface of the arm 42 and the lower edge surface of the member 50 for preventing longitudinal movement of the clip relative to the bracket. The other leg 80 of the clip is extended upwardly along the opposite inward edge of the bracket a selected distance and is bent inwardly and upwardly as at 82 and terminates in a vertically disposed end portion 84 which is adapted to bear against the pivot pin 54 between the bosses 58. Thus the clip 74 resiliently retained by the bracket 36 and bearing firmly against the pin 54 offers no appreciable amount of restraint to the gravitational attraction of the socket 56 in pivoting on the pin 54 but tends to prevent small amplitudes of movement thereof and holds the bulb in firm contact with the battery terminal once such contact is made. Since the leverage of the clip end 84 on the pin 54 is small compared to the leverage of the mass of the socket 56, gravitational attraction easily overcomes the resilient restraint of the clip when the device is definitely tilted.

*Operation*

Figure 2:
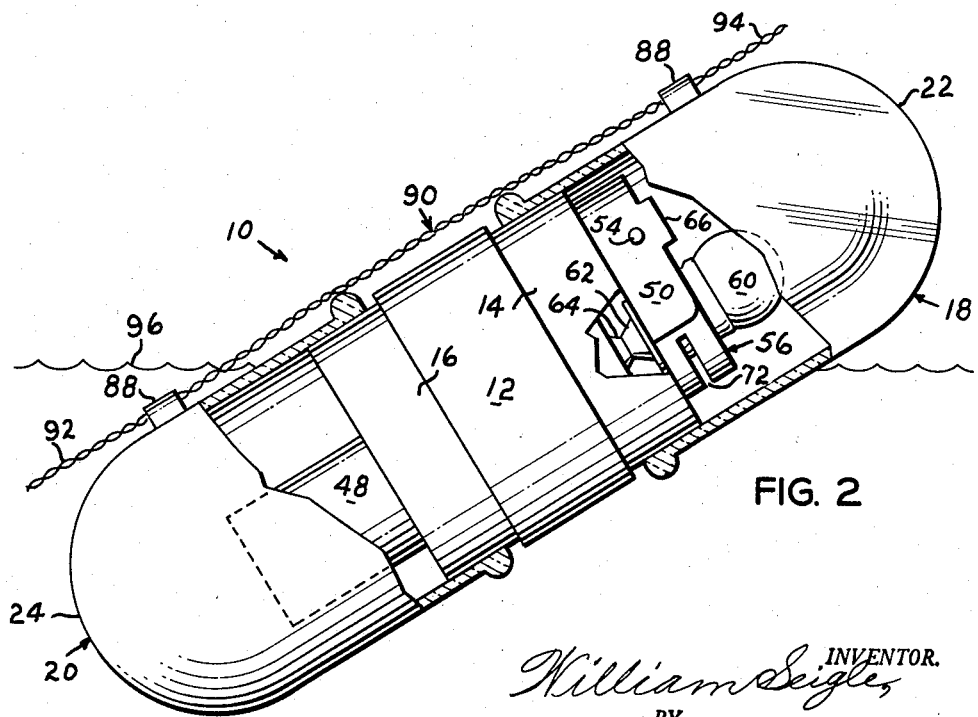
Figure 2 is a view similar to Fig. 1 illustrating the approximate position of the device when tilted as a result of a fish bite on the line.

In operation the device is assembled substantially as disclosed hereinabove. The caps 18 and 20 are each exteriorly provided with line engaging loops or eyes 88 through which a fishing line 90 may be passed, or to which the line may be secured. As viewed in Fig. 1, the left hand vertical portion of the line 92 leads to the fishhook and bait, not shown, while the right hand vertical portion of line 94 is connected with the fishing pole or reel, not shown. The mass of the bracket 36, battery 48 and socket 56 is longitudinally adjusted within the body 12 so that the device 10 floats in the water in substantially the position shown in Fig. 1. The upper surface of the water being indicated by the wavy line 96. Thus, as shown in Fig. 1, gravitational attraction for the socket 56 has moved the same so that the bulb 60 is out of contact with the battery terminal, the movement of the socket in this direction being limited by the lugs 66. When a fish strikes or takes the bait the line portion 92 is pulled downwardly thus tilting or disposing the device 10 in substantially the position shown in Fig. 2. In this position gravitational attraction has swung the socket 56 so that the bulb 60 makes electrical contact with the battery terminal end 64, thus exciting the bulb filament which is readily visible through the cap 18.

The device 10 may be readily used as a fishing float or lure without the use of the illuminating qualities, as for example in day time fishing, by manually moving the battery longitudinally of the arms 40 and 42 away from contact position with the bulb 60 or by removing the battery from the device. Similarly the device may be used as a constantly illuminated night fishing float or lure by manually moving the battery so that the terminal end 64 thereof is in continuous contact with the base 62 of the lamp 60.

It seems readily obvious that various floating angles of the device relative to the surface of the water may be obtained by simply moving the bracket 36 longitudinally of the body 12 to change the center of gravity of the device.

The battery 48 and bulb 60 may be easily replaced by simply removing the respective cap 20 or 18.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An illuminating fishing float, comprising: a tubate body; tubular cap means adapted to be closely received by the respective ends of said body to effect a water tight seal, each of said cap means having a semi-spherical closed end, said body having an annular recess in its bore; a split sleeve of resilient material carried by the recess in said body, that portion of said split sleeve opposite the split forming a chord subtending an arc of the recess in said body; a battery holder frictionally carried for longitudinal adjustment between the chord of said split sleeve and the inner wall of said body; a battery frictionally carried by said holder; a bulb carrier pivotally mounted on said holder adjacent the terminal end of said battery; lugs integrally carried by said battery holder for limiting the pivoting movement of said bulb carrier; a light bulb threadedly supported by said bulb carrier in a manner to gravitationally swing into and out of circuit making contact with the terminal of said battery when the float is tilted longitudinally; and bulb carrier stabilizing means carried by the holder for frictionally stabilizing the bulb carrier while the bulb is in circuit making contact with the battery terminal.

2. An illuminating fishing float, comprising: a tubate body; tubular cap means adapted to be closely received by the respective ends of said body to effect a water tight seal therewith, each of said cap means having a semi-spherical closed end, said body having an annular recess intermediate the ends of its bore; a split sleeve of resilient material carried by the recess in said body, said split sleeve having a chord subtending an arc of the recess in said body; a bracket adjustably carried longitudinally between the chord of said split sleeve and the inner wall of said body, said bracket having laterally extending friction arms contacting the chord of said split sleeve; a battery held by the arms of said bracket; a split socket pivotally mounted on the end of said bracket adjacent the terminal end of said battery; lugs carried by said bracket for limiting the movement of said split socket; a light bulb threadedly supported by said split socket in a manner to gravitationally swing into and out of circuit making contact with the terminal of said battery when the float is tilted; and stabilizing means carried by the bracket for stabilizing the split socket while the bulb is in circuit making contact with the terminal of said battery.

3. An illuminating fishing float, comprising: a tubate body; transparent tubular cap means adapted to be closely received by the respective ends of said body to effect a water tight seal therewith and form an elongated float, each of said cap means having a semi-spherical closed end, said body having an annular recess intermediate the ends of its bore; a split sleeve of resilient metallic material carried by the recess of said body, said split sleeve having a chord subtending an arc of the recess in said body; a bracket adjustably carried longitudinally between the chord of said split sleeve and the inner wall of said body for selectively positioning the center of gravity of said float, said bracket having laterally extending friction arms contacting the chord portion of said split sleeve and maintaining said bracket in place; a dry cell battery held by the arms of said bracket; a split socket pivotally mounted on the end of said bracket adjacent the terminal end of said battery; lugs carried by said bracket for limiting the pivoting movement of said socket; a light bulb threadedly supported by said socket in a manner to gravitationally swing into and out of circuit making contact with the terminal of said battery when the float is tilted; and resilient means carried by the bracket for stabilizing the socket while the bulb is in circuit making contact with the terminal of said battery.

References Cited in the file of this patent

UNITED STATES PATENTS

| | | |
|---|---|---|
| 2,544,968 | Seigle | Mar. 13, 1951 |
| 2,654,972 | Hollingsworth | Oct. 13, 1953 |